United States Patent
Saghir et al.

(10) Patent No.: US 11,483,356 B2
(45) Date of Patent: *Oct. 25, 2022

(54) SYSTEMS AND METHODS FOR NEXT GENERATION MOBILE NETWORK OPTIMIZED MEDIA PATH SELECTION

(71) Applicant: Verizon Patent and Licensing Inc., Basking Ridge, NJ (US)

(72) Inventors: Amir Saghir, Frisco, TX (US); Ali Imdad Malik, East Brunswick, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 7 days.

This patent is subject to a terminal disclaimer.

(21) Appl. No.: 17/160,805

(22) Filed: Jan. 28, 2021

(65) Prior Publication Data

US 2021/0152613 A1 May 20, 2021

Related U.S. Application Data

(63) Continuation of application No. 16/406,273, filed on May 8, 2019, now Pat. No. 10,944,797.

(51) Int. Cl.
| | | |
|---|---|---|
| *H04L 29/06* | (2006.01) | |
| *H04L 65/1016* | (2022.01) | |
| *H04L 43/0852* | (2022.01) | |
| *H04L 65/1073* | (2022.01) | |
| *H04W 76/12* | (2018.01) | |

(52) U.S. Cl.
CPC ...... *H04L 65/1016* (2013.01); *H04L 43/0852* (2013.01); *H04L 65/1073* (2013.01); *H04W 76/12* (2018.02)

(58) Field of Classification Search
CPC ......... H04L 29/06312; H04L 29/06197; H04L 29/06272; H04L 29/06244; H04L 29/06517; H04L 29/06278; H04L 9/0838; H04L 29/06326; H04L 65/1083; H04L 65/1046; H04L 65/1006; H04L 65/1063; H04L 65/1016; H04L 65/1069; H04W 76/11; H04W 8/18; H04W 72/04; H04W 24/02; H04W 48/00
See application file for complete search history.

(56) References Cited

U.S. PATENT DOCUMENTS

2002/0150092 A1* 10/2002 Bontempi ........... H04L 12/1818
370/328
2008/0032695 A1* 2/2008 Zhu ................... H04W 36/0022
455/442

(Continued)

*Primary Examiner* — Jung Liu

(57) ABSTRACT

A network device receives a first message that includes an identifier (ID) of a first User Plane Function (UPF), serving a first device, in a wireless network, where the first message invites a second device to engage in a session with the first device and where the first UPF supports packet routing and forwarding within the wireless network. The network device extracts the ID of the first UPF from the first message and determines a closest media resource function (MRF) to the first UPF, where the MRF processes and routes media streams between devices. The network device assigns the determined MRF as an anchor, in a network path between the first device and the second device, for processing and routing of media streamed between the first device and the second device.

20 Claims, 13 Drawing Sheets

(56) References Cited

U.S. PATENT DOCUMENTS

| | | | |
|---|---|---|---|
| 2009/0245256 A1* | 10/2009 | Yan | H04L 12/18 |
| | | | 370/390 |
| 2014/0198173 A1* | 7/2014 | Willig | H04L 67/02 |
| | | | 348/14.06 |
| 2017/0353878 A1* | 12/2017 | Yamada | H04W 24/08 |
| 2018/0035284 A1* | 2/2018 | Fujinami | H04W 8/245 |
| 2018/0041549 A1* | 2/2018 | Noldus | H04L 65/1046 |
| 2018/0077001 A1* | 3/2018 | Noldus | H04L 65/1069 |
| 2019/0158408 A1* | 5/2019 | Li | H04L 67/104 |
| 2019/0215729 A1* | 7/2019 | Oyman | H04L 5/0082 |
| 2020/0220905 A1* | 7/2020 | Park | H04L 69/24 |
| 2020/0252900 A1* | 8/2020 | Kim | H04W 36/0022 |

\* cited by examiner

SYSTEMS AND METHODS FOR NEXT GENERATION MOBILE NETWORK OPTIMIZED MEDIA PATH SELECTION

This patent application claims priority to and is a continuation of U.S. patent application Ser. No. 16/406,273, filed on May 8, 2019, titled "Systems and Methods for Next Generation Mobile Network Optimized Media Path Selection," the disclosure of which is incorporated by reference herein in its entirety.

BACKGROUND INFORMATION

Background

Long Term Evolution (LTE) is a mobile telecommunications standard, promulgated by the European Telecommunications Standards Institute (ETSI), for wireless communication involving mobile user equipment, such as mobile devices and data terminals. LTE networks include existing Fourth Generation (4G), and 4.5 Generation (4.5G) wireless networks. The goals of LTE included increasing the capacity and speed of wireless data networks and redesigning and simplifying the network architecture to an Internet Protocol (IP)-based system with reduced latency compared to the Third Generation (3G) network architecture.

Next Generation mobile networks have been proposed as the next evolution of mobile wireless networks, such as the existing 4G and 4.5G LTE mobile networks. Next Generation mobile networks, such as Fifth Generation New Radio (5G NR) mobile networks, are expected to operate in the higher frequency ranges, and such networks are expected to transmit and receive in the GigaHertz frequency band with a broad bandwidth near 500-1,000 MegaHertz. The expected bandwidth of Next Generation mobile networks is intended to support download speeds of up to about 35-50 Gigabits per second. The proposed 5G mobile telecommunications standard, among other features, may operate in the millimeter wave bands (e.g., 14 GigaHertz (GHz) and higher), and supports more reliable, massive machine communications (e.g., machine-to-machine (M2M), Internet of Things (IoT)). Next Generation mobile networks, such as those implementing the 5G mobile telecommunications standard, are expected to enable a higher utilization capacity than current wireless systems, permitting a greater density of wireless users, with a lower latency. Next Generation mobile networks, thus, are designed to increase data transfer rates, increase spectral efficiency, improve coverage, improve capacity, and reduce latency.

The Internet Protocol (IP) multimedia subsystem (IMS) defines a set of specifications that enables the convergence of voice, video, data and mobile technology over an all IP-based network infrastructure. In particular, IMS fills the gap between the two most successful communication paradigms—cellular and Internet technology, by providing Internet services everywhere using cellular technology in a more efficient way. Session Initiation Protocol (SIP) is the main protocol for IMS. SIP is an application layer control (signaling) protocol for creating, modifying and terminating sessions (e.g., voice sessions) with one or more participants.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

During Voice over Long-Term Evolution (VoLTE) calls in Fourth Generation (4G) Mobile Networks, media (e.g., audio) associated with the calls traverses the transport network between at least two endpoint UEs. Media Resource Functions (MRFs) of the IMS network may be selected such that the MRFs' Media Resource Function Processors (MRFPs) can process and route the calls between the endpoint UEs. When a UE originates or terminates a VoLTE call, the IMS network uses the UE's serving Packet Gateway (PGW) information for the SIP signaling and media flow. In networks, having different network architecture than 4G networks, such as, for example, Next Generation Mobile networks, different techniques need to be used for the media processing and routing of Voice over New Radio (VoNR) calls between call endpoints.

Exemplary embodiments described herein route VoNR calls between call endpoints based on a mapping between Next Generation Mobile network User Plane Functions (UPFs) and the closest MRFs to those UPFs so as to minimize, for example, end-to-end latency during media transport between call endpoints. The MRFs that are closest to particular UPFs in the transport network(s) are determined, and then mapped in a data structure for storage in a database. When a Call Session Control Function (CSCF) of the IMS network receives a SIP invite message associated with a VoNR call between call endpoints, the CSCF determines the UPF serving the call originating UE and obtains, from the user profile associated with the UE, the UPF identifier (e.g., the UPF network address). The CSCF inserts the UPF identifier into the SIP invite message and forwards the message to the terminating CSCF in the IMS network. The terminating CSCF extracts the UPF identifier from the SIP invite message and performs a lookup into the database to retrieve a closest MRF to the serving UPF. In some implementations, a closest MRF to the serving UPF includes a UPF whose location in the transport network(s) minimizes end-to-end latency associated with the media transport of the VoNR call. The terminating CSCF instructs the serving UPF to route media associated with the VoNR call to the retrieved, closest MRF. The serving UPF then routes the media associated with the VoNR call to the selected MRF for media processing (and/or other processing functions) and routing towards the destination UE.

Figure 1A:
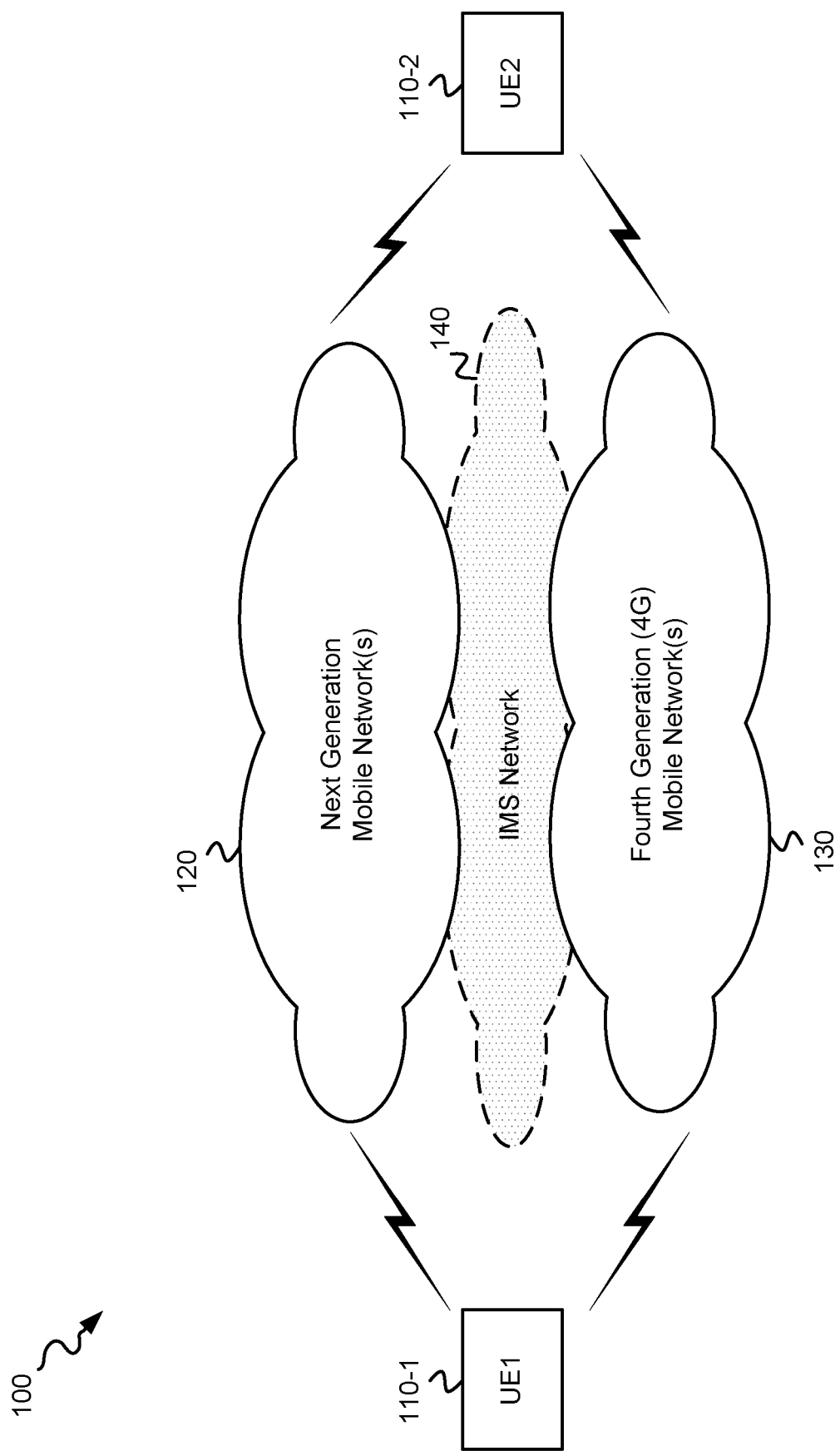
FIG. 1A illustrates an exemplary network environment in which user equipment (UEs) may send and/or receive voice calls.

FIG. 1A illustrates an exemplary network environment 100 in which user equipment (UEs) may send and/or receive voice calls. As shown, network environment 100 includes UEs 110-1 and 110-2, a Next Generation Mobile Network(s) 120, a Fourth Generation (4G) Mobile network(s) 130, and an IMS network 140. Network environment 100 may further include a packet data network (not shown in FIG. 1A). The transport portion of network environment 100 is described with respect to FIGS. 1B, 2A, 2B, 3A, and 3B below.

UEs 110-1 and 110-2 (referred to herein as "UE 110" or "UEs 110") may each include any type of computational device that communicates via networks 120, 130, and/or 140. UEs 110 may each include, for example, a computer (e.g., desktop, laptop, tablet, or wearable computer), a personal digital assistant (PDA), a "smart" phone, or a "Machine-to-Machine" (M2M) or "Internet of Things" (IoT) device. A "user" (not shown) may own, operate, administer, and/or carry each UE 110.

Next Generation Mobile network 120 includes any type of a Next Generation Mobile network that includes evolved network components (e.g., future generation components) relative to an LTE network, such as a 4G or 4.5G mobile network. In one implementation, Next Generation Mobile network 120 may include a 5G mobile network. 4G network 130 includes any type of a PLMN or satellite network that implements a LTE mobile telecommunications standard, such as the 4G or 4.5G LTE standard. 4G network 130 may include any other type of PLMN or satellite network, including a non-LTE network. IMS network 140 includes a network that uses the Session Initiation Protocol (SIP) for voice and multimedia session control, such as for creating, modifying and terminating sessions between devices (e.g. UEs 110-1 and 110-2).

The configuration of network components of network environment 100 shown in FIG. 1 is for illustrative purposes. Other configurations may be implemented. Therefore, network environment 100 may include additional, fewer and/or different components that may be configured in a different arrangement than that depicted in FIG. 1. For example, network environment 100 may include numerous UEs (e.g., UEs 110-1 through 110-x, where x>2).

Figure 1B:
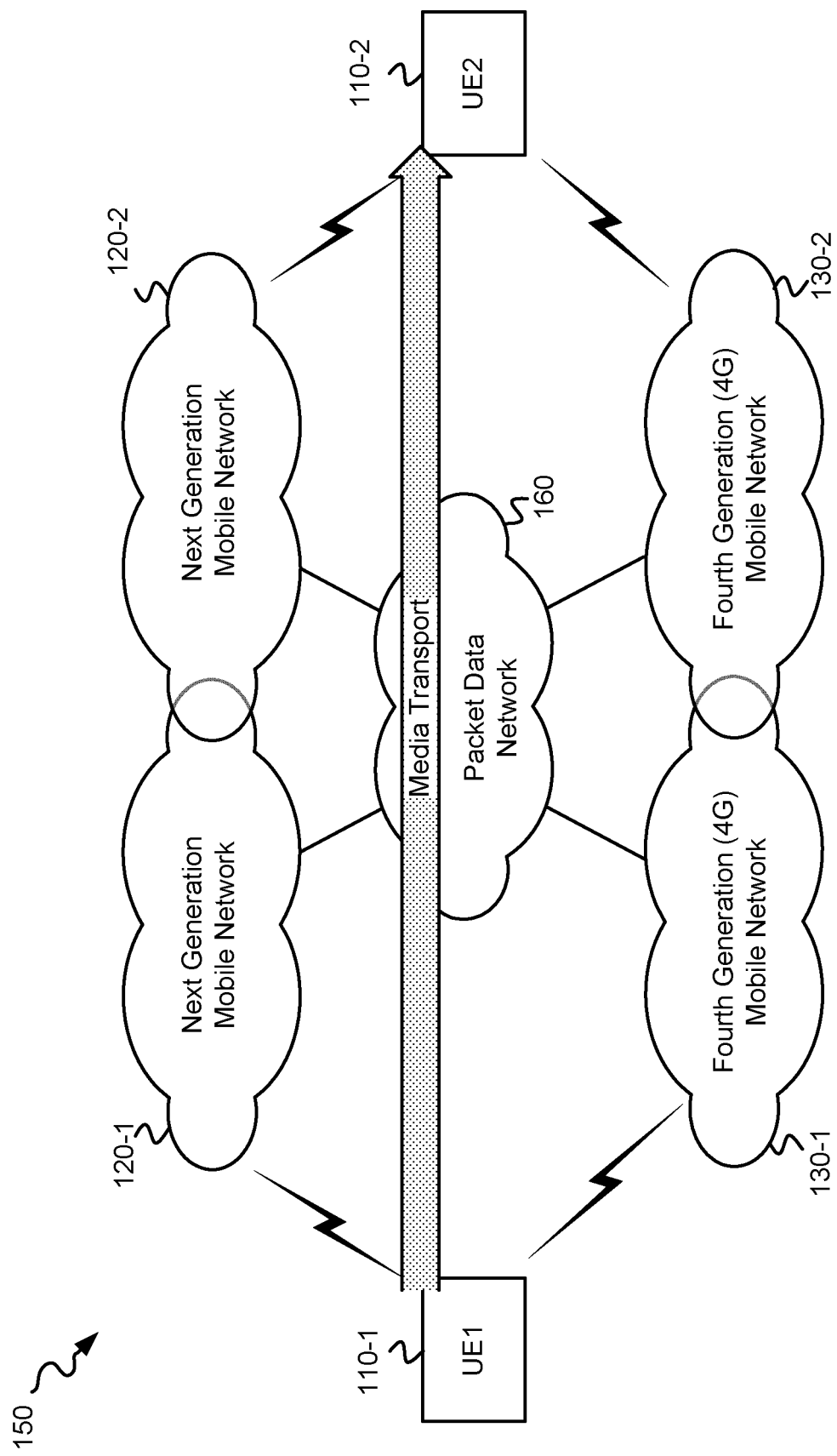
FIG. 1B illustrates a transport portion of the network environment of FIG. 1A used for transporting packet-switched calls between UEs.

FIG. 1B illustrates a transport portion 150 of the network environment 100 of FIG. 1A used for transporting packet-switched voice calls between UEs 110. Transport portion 150 may include a first Next Generation Mobile network 120-1, a second Next Generation Mobile Network 120-2, a first 4G Mobile Network 130-1, a second 4G Mobile Network 130-2, and a packet data network 160. In some implementations, first Next Generation Mobile network 120-1 and second Next Generation Mobile Network 120-2 include different mobile networks operated by different mobile network operators (MNOs). In other implementations, first Next Generation Mobile network 120-1 and second Next Generation Mobile Network 120-2 include a same mobile network operated by a same MNO. Further, in some implementations, first 4G Mobile network 130-1 and second 4G Mobile Network 130-2 include different 4G mobile networks operated by one or more different MNOs. In other implementations, first 4G Mobile network 130-1 and second 4G Mobile Network 130-2 include a same mobile network operated by a same MNO.

Packet data network 160 includes any type of network that performs data packet-switched data transport. Packet data network 160 may include, for example, a telecommunications network (e.g., Public Switched Telephone Networks (PSTNs)), a wired and/or wireless local area network (LAN), a wired and/or wireless wide area network (WAN), a metropolitan area network (MAN), an intranet, the Internet, and/or a cable network (e.g., an optical cable network). Packet data network 160 may include wired or wireless links between itself and Next Generation Mobile networks 120-1 and 120-2 and 4G Mobile Networks 130-1 and 130-2.

In certain implementations, Next Generation Mobile Network 120-2 of FIG. 1B may be replaced with a communications network that is different than Next Generation Mobile Network 120-1 such as, for example, a PSTN or CDMA network, or other non-Next Generation Mobile Network. In such implementations, a voice call transported between UE1 110-1 and UE2 110-2 may traverse Next Generation Mobile Network 120-1, cross into the different communications network (e.g., a PSTN or CDMA network) via, for example, a Session Border Controller (SBC), and then traverse the different network to arrive at the destination UE2 110-2. Though not shown in FIG. 1B, the voice call between UE1 110-1 and UE2 110-2 may additionally include call transport in the opposite direction than that shown in FIG. 1B.

Figure 2A:
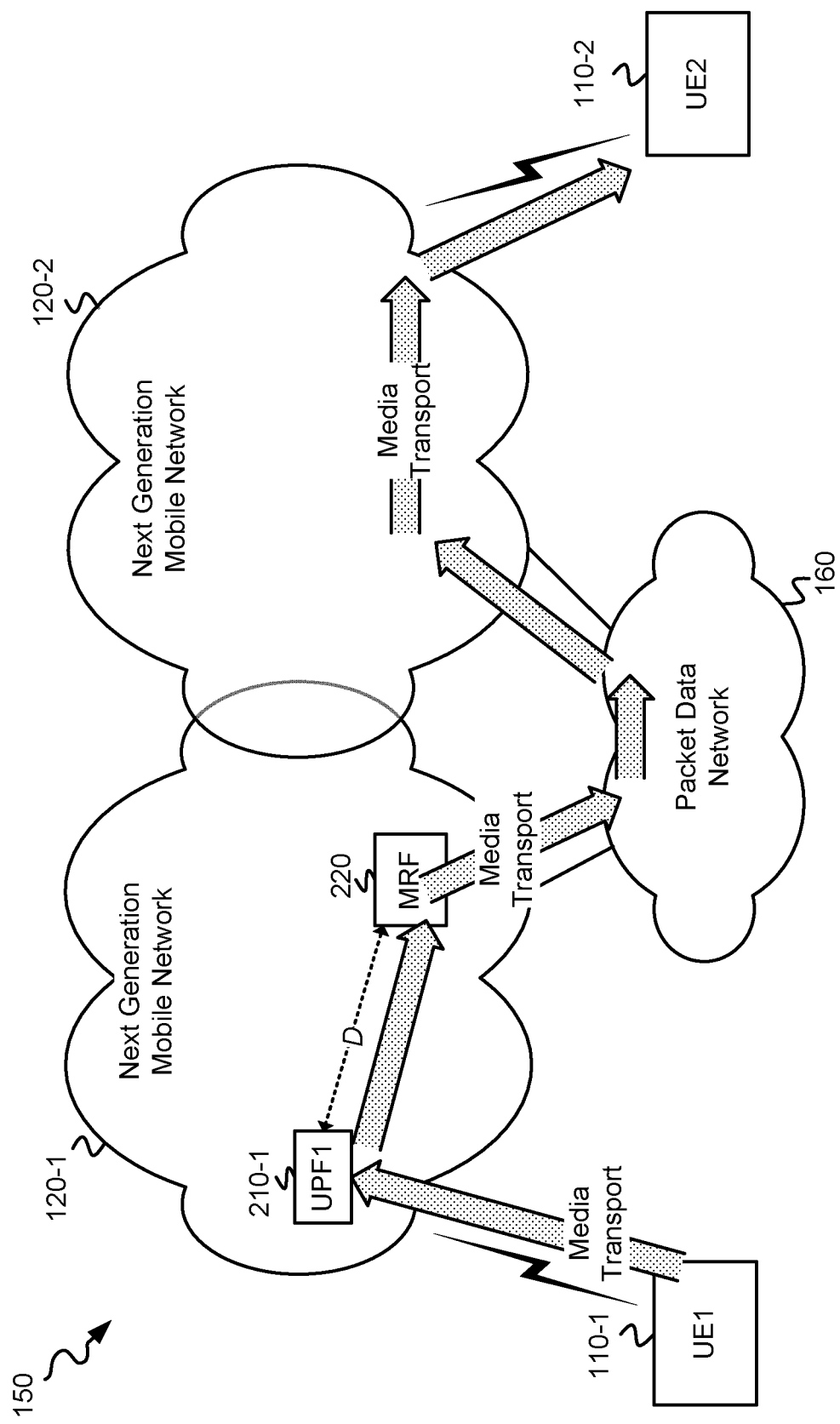
FIG. 2A illustrates media transport, associated with a voice call, in a first example in which the call endpoint UEs are connected to a same Next Generation Mobile Network, or to different Next Generation Mobile Networks.

FIG. 2A illustrates a first example of media transport, associated with a voice call, across the transport portion 150 of the network environment 100 of FIG. 1B between UE1 110-1 and UE2 110-2. In the example of FIG. 2A, both UE1 110-1 and UE2 110-2 are connected to a same Next Generation Mobile Network, or to different Next Generation Mobile Networks. As shown, a voice call (e.g., VoNR voice call), originating from UE1 110-1 involves media transport (e.g., packet-switching of a media stream) from UE1 110-1 to Next Generation Mobile network 120-1 and on to packet data network 160. Packet data network 160 transports the voice media, as described in further detail below, to Next Generation Mobile network 120-2 (which may be a different mobile network, or a same mobile network) which, in turn, transports the media to the UE2 110-2 as the call destination. The voice call transport path traverses Next Generation Mobile Network 120-1 from UE1 110-1 to UPF1 210 to MRF 220 and on packet data network 160. The voice call transport path, after transport via packet data network 160, then traverses Next Generation Mobile Network 120-2 to voice call destination UE2 110-1. A Media Resource Function Processor (MRFP)(not shown) of the Media Resource Function (MRF) 220) may process and/or mix the transported media stream as, for example, the media stream is transported between the call endpoints UE1 110-1 and UE2 110-2. The processing of the media stream by the MRFP of MRF 220 may include, for example, bridging multiple streams for conferencing, audio transcoding, recording, media analysis (e.g., speech recognition), text-to-speech rendering, video processing, and announcement playing. The MRF 220 (e.g., the MRF's MRFP) may be located within Next Generation Mobile Network 120-1 (as shown), or within packet data network 160 (not shown). Though not depicted in FIG. 2A, the same call may include a bi-directional voice call that also involves media transport from UE2 110-2 to UE1 110-1 via a path that is a reverse of that shown in FIG. 2A.

Figure 2B:
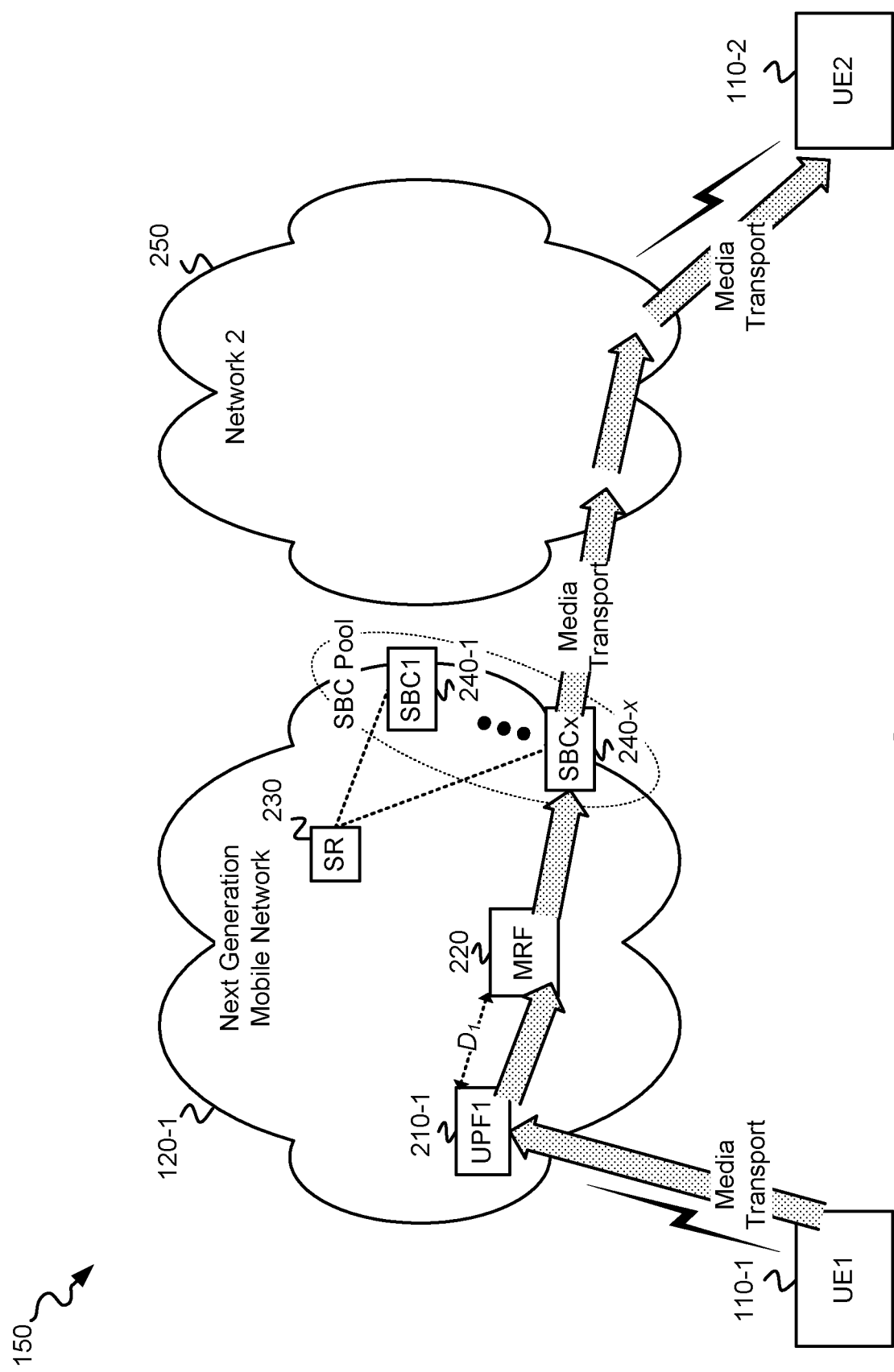
FIG. 2B illustrates media transport, associated with a voice call, in a second example in which one call endpoint UE is connected to a Next Generation Mobile Network and the other call endpoint UE is connected to a second, different network, such as a PSTN network, CDMA network, or other non-Next Generation Mobile Network.

FIG. 2B illustrates a second example of media transport, associated with a voice call, across the transport portion 150 of the network environment 100 of FIG. 1B between UE1 110-1 and UE2 110-2. In the example of FIG. 2B, UE1 110-1 is connected to Next Generation Mobile Network 120-1, and UE2 110-2 is connected to a second, different network, such as, for example, a PSTN or CDMA network, or other non-Next Generation Mobile Network. As shown, a voice call, originating from UE1 110-1 involves media transport (e.g., packet-switching of a media stream) from UE1 110-1 to Next Generation Mobile network 120-1 and on to network 2 250 via a SBC. The voice call transport path traverses Next Generation Mobile Network 120-1 from UE1 110-1 to UPF1 210 to MRF 220 and on to a SBC that connects to network 2 250. The voice call transport path then traverses network 2 250 and arrives at the call destination endpoint UE2 110-2. A session router (SR) 230 in, for example, Next Generation Mobile Network 120-1, includes a control element that selects a SBC, from a pool of SBCs, for routing media traffic associated with the voice call through the SBC to network 2 250. The pool of SBCs may include SBC 1 240-1 through SBCx 240-x, where x is greater than or equal to one and where each SBC 240 may be located at a different network location, having a different network distance (e.g., associated with a different transport latency) from MRFP 220 and/or UPF1 210. Each SBC 240, therefore, may cause a different end-to-end latency in a voice call session transported via that SBC 240 due each SBC 240's different network location. As described further below, a SBC 240 from the SBC pool may be selected that has a nearest network distance (e.g., a least latency) to MRFP 220 so as to minimize the end-to-end latency of the transported voice call between UE1 110-1 and 110-2. Though not depicted in FIG. 2B, the same call may include a bi-directional voice call that also involves media transport from UE2 110-2 to UE1 110-1 via a path that is a reverse of that shown in FIG. 2B.

Figure 3A:
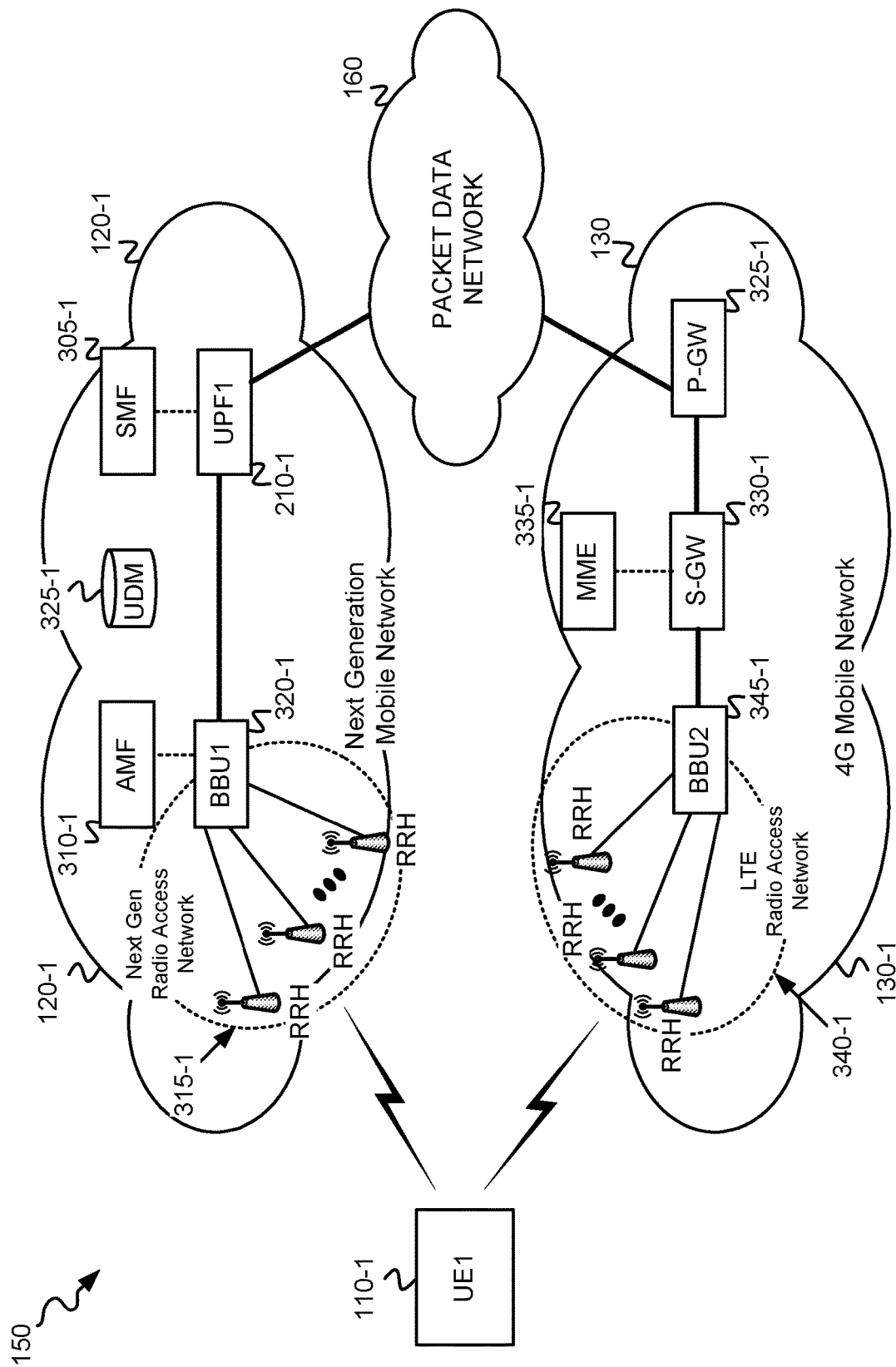
FIGS. 3A and 3B illustrate further details of the transport portion of the network environment of FIG. 1B.
Figure 3B:
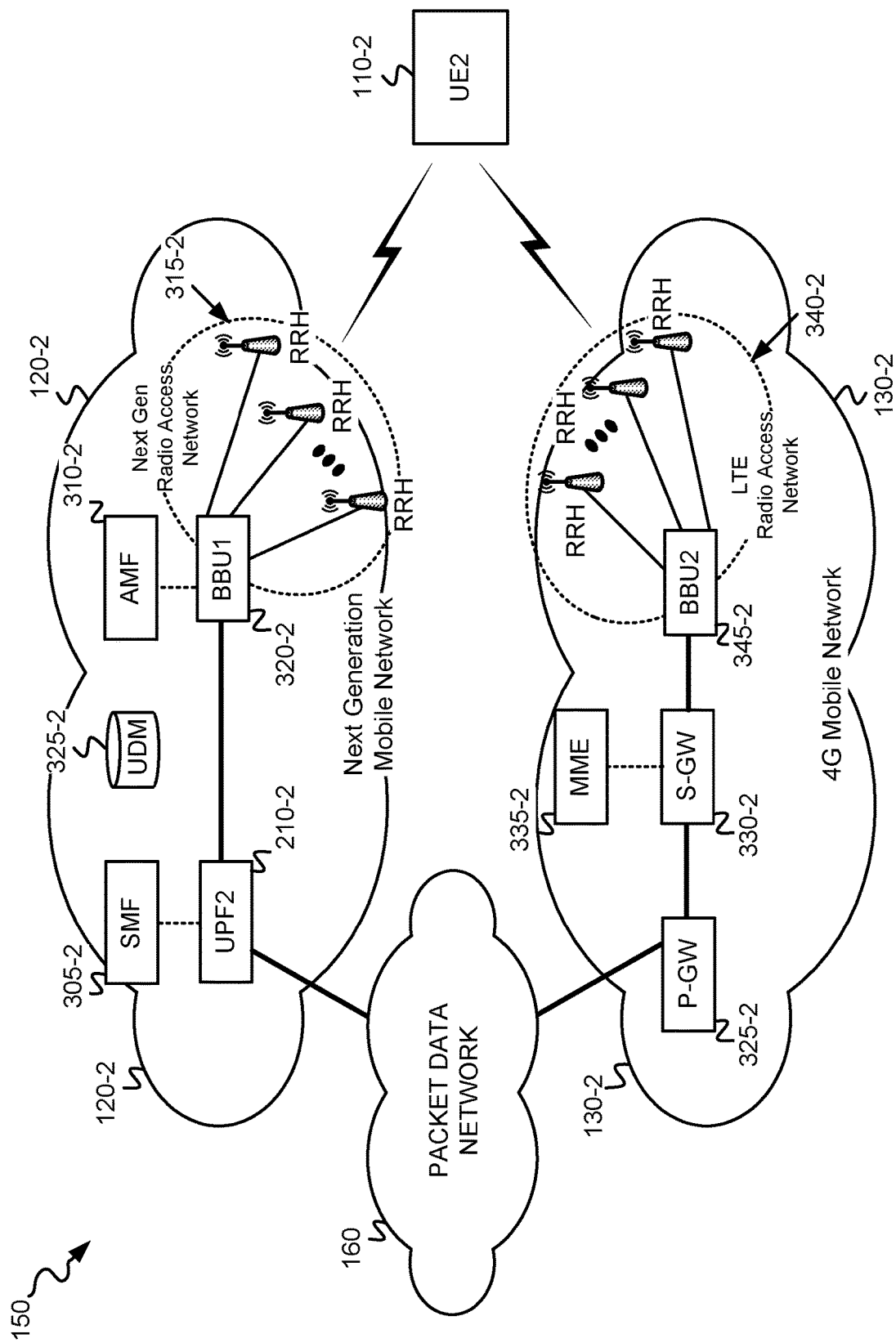

FIGS. 3A and 3B illustrate further details of the transport portion 150 of the network environment 100 of FIG. 1B, including details of components of first Next Generation Mobile network 120-1, second Next Generation Mobile Network 120-2, first 4G Mobile Network 130-1, and second 4G Mobile Network 130-2.

In the VoNR call originating side of the portion 150 of the network environment, shown in FIG. 3A, Next Generation Mobile network 120-1 includes, among other nodes, a User Plane Function (UPF1) node 210-1 (referred to herein as "UPF 210" or "UPFs 210"), a Session Management Function (SMF) node 305-1 (referred to herein as "SMF 305" or "SMFs 305"), an Access Management Function (AMF) node 310-1 (referred to herein as "AMF 310" or "AMFs 310"), a Next Generation Radio Access Network (RAN) 315-1 (referred to herein as "RAN 315" or "RANs 315"), and a Unified Data Management (UDM) node 325-1 (referred to herein as "UDM 325" or "UDMs 325").

UPF node 210-1 includes a network device that acts as a router and a gateway between Next Generation Mobile network 120-1 and packet data network 160, and forwards session data between the packet data network 160 and a base band unit in Next Generation Mobile network 120-1. Though only a single UPF 210-1 is shown, Next Generation Mobile network 120-1 may include multiple UPF devices 210 disposed at various locations in network 120-1. SMF node 205-1 includes a network device that performs session management, allocates network addresses to UEs 110, and selects and controls the UPF 210-1 for data transfer. AMF node 310-1 includes a network device that performs UE-based authentication, authorization, and mobility management for UEs 110.

Next Generation RAN 315-1 may include a first base band unit (BBU1) 320-1 and multiple remote radio heads (RRHs). BBU1 320-1 may connect to the multiple RRHs via, for example, optical fibers. BBU1 320-1 includes a network device that operates as a digital function unit that transmits digital baseband signals to the multiple RRHs, and receives digital baseband signals from the multiple RRHs. If BBU1 320-1 is connected to the multiple RRHs via, for example, optical fibers, then BBU1 320-1 may convert the digital baseband signals into corresponding optical signals for transmission to the RRHs, and may receive optical signals from the RRHs and convert the optical signals into corresponding digital baseband signals.

The RRHs include network devices that operate as radio function units that transmit and receive radio frequency (RF) signals to/from UEs 110. If the RRHs are connected to BBU1 320-1 via an optical fiber, the RRHs may convert received RF signals to optical signals, and transmit the optical signals to BBU1 320-1. Additionally, the RRHs may receive optical signals from BBU1 320-1 via the optic fiber, convert the optical signals to RF signals for transmission via one or more antennas (e.g., one or more antenna arrays) of the RRHs. Each of the RRHs may include at least one antenna array, transceiver circuitry, and other hardware and software components for enabling the RRHs to receive data via wireless RF signals from UE 110, and to transmit wireless RF signals to UE 110. If Next Generation Mobile network 120-1 is a 5G New Radio (NR) network, BBU1 320-1 and the associated RRH(s) represent a distributed Next Generation NodeB, which may also be referred to as a "gNB," or an enhanced LTE (eLTE) eNB that can connect to Next Generation Mobile network 120-1.

As further shown in the VoNR call originating side of the portion 150 of the network environment, shown in FIG. 3A, 4G Mobile Network 130-1 includes, among other nodes, a Packet Gateway node (P-GW) 325-1, a Serving Gateway node (S-GW) 330-1, a Mobility Management Entity node (MME) 335-1, and an LTE RAN 340-1.

Packet Gateway node (P-GW) 325-1 includes a network device that acts as a router and a gateway between 4G Mobile Network 130-1 and packet data network 160, and forwards session data between packet data network 160 and a base band unit in 4G Mobile Network 130-1. Serving Gateway node (S-GW) 330-1 includes a network device that routes and forwards session data between P-GW 325-1 and a LTE RAN serving the session's destination UE 110.

Mobility Management Entity node (MME) 335-1 includes a network device that acts as a control entity for 4G Mobile Network 130-1, including communicating with a Home Subscriber Server (HSS) (not shown in FIG. 3A) of 4G Mobile Network 130-1 for user/device authentication and for user/device profile download. MME node 335-1 further provides UEs 110 with mobility management and session management functions using, for example, Network Access Stratum (NAS) signaling.

LTE RAN 340-1 may include a base band unit (BBU2) 345-1 and multiple remote radio heads (RRHs). LTE 340-1 may include one or more additional base band units (BBUs) and RRHs, and other wireless nodes and components, not shown in FIG. 3A. BBU2 345-1 may connect to the multiple RRHs via, for example, optical fibers. BBU2 345-1 includes a network device that operates as a digital function unit that transmits digital baseband signals to the multiple RRHs, and receives digital baseband signals from the multiple RRHs. If BBU2 345-1 is connected to the multiple RRHs via, for example, optical fibers, then BBU2 345-1 may convert the digital baseband signals into corresponding optical signals for transmission to the RRHs, and may receive optical signals from the RRHs and convert the optical signals into corresponding digital baseband signals.

The RRHs include network devices that operate as radio function units that transmit and receive radio frequency (RF) signals to/from UEs 110. If the RRHs are connected to BBU2 345-1 via an optical fiber, the RRHs may convert received RF signals to optical signals, and transmit the optical signals to BBU2 345-1. Additionally, the RRHs may receive optical signals from BBU2 345-1 via the optic fiber, convert the optical signals to RF signals for transmission via one or more antennas (e.g., one or more antenna arrays) of the RRHs. Each of the RRHs may include at least one antenna array, transceiver circuitry, and other hardware and software components for enabling the RRHs to receive data via wireless RF signals from UE 110-1, and to transmit wireless RF signals to UE 110-1. BBU2 345-1 and the associated RRH(s) represent a distributed evolved NodeB (eNB).

In the VoNR call terminating side of the portion 150 of the network environment, shown in FIG. 3B, Next Generation Mobile network 120-2 includes similar nodes to those described with respect to Next Generation Mobile network 120-1, including, among other nodes, a UPF2 node 210-2, a SMF node 305-2, an AMF node 310-2, a Next Generation RAN 315-2, and a UDM node 325-2. In circumstances where the VoNR call originates in a first mobile network operated by a first MNO, and terminates in a different, second mobile network operated by a second MNO, then Next Generation Mobile networks 120-1 and 120-2 include separate, different mobile networks interconnected via, for example, packet data network 160. In circumstances where the VoNR call originates in a first mobile network operated by a first MNO, and terminates in the same mobile network, then Next Generation Mobile networks 120-1 and 120-2 are portions of a same Next Generation Mobile 120 that interconnects with packet data network 160.

UPF2 node 210-2 includes a network device that acts as a router and a gateway between packet data network 160 and Next Generation Mobile network 120-2, and forwards session data between a base band unit in Next Generation Mobile network 120-2 and packet data network 160. Though only a single UPF2 210-2 is shown, Next Generation Mobile network 120-2 may include multiple UPF devices 210 disposed at various locations in network 120-2. SMF node 305-2 includes a network device that performs session management, allocates network addresses to UEs 110, and selects and controls the UPF2 210-2 for data transfer. AMF node 310-2 includes a network device that performs UE-based authentication, authorization, and mobility management for UEs 110.

Next Generation RAN 315-2 may include a base band unit (BBU1) 320-2 and one or more remote radio heads (RRHs). BBU1 320-2 may connect to the one or more RRHs via, for example, optical fibers. BBU1 320-2 includes a network device that operates as a digital function unit that transmits digital baseband signals to the RRHs, and receives digital baseband signals from the RRHs. If BBU1 320-2 is connected to the RRH(s) via, for example, optical fibers, then BBU1 320-2 may convert the digital baseband signals into corresponding optical signals for transmission to the RRHs and may receive optical signals from the RRHs and convert the optical signals into corresponding digital baseband signals.

The RRH(s) each includes network devices that operate as radio function units that transmit and receive radio frequency (RF) signals to/from UEs 110. If the RRHs are connected to BBU1 320-2 via an optical fiber, the RRHs may convert received RF signals to optical signals, and transmit the optical signals to BBU1 320-2. Additionally, the RRHs may receive optical signals from BBU1 320-2 via the optic fiber and convert the optical signals to RF signals for transmission via one or more antennas (e.g., one or more antenna arrays) of the RRHs. Each of the RRHs may include at least one antenna array, transceiver circuitry, and other hardware and software components for enabling the RRHs to receive data via wireless RF signals from a UE 110, and to transmit wireless RF signals to UE 110. If Next Generation Mobile network 120-2 is a 5G New Radio (NR) network, BBU1 320-2 and the associated RRH(s) represent a distributed Next Generation NodeB, which may also be referred to as a "gNB," or an enhanced LTE (eLTE) eNB that can connect to Next Generation Mobile network 120-2.

As further shown in the VoNR call terminating side of the portion 150 of the network environment, shown in FIG. 3B, 4G Mobile Network 130-2 includes similar nodes to those described with respect to 4G Mobile Network 130-1, including, among other nodes, a P-GW 325-2, a S-GW 330-2, a MME 335-3, and an LTE RAN 340-2. In circumstances where a 4G LTE call originates in a first mobile network operated by a first MNO, and terminates in a different, second mobile network operated by a second MNO, then 4G Mobile networks 130-1 and 130-2 include separate, different mobile networks interconnected via, for example, packet data network 160. In circumstances where the 4G LTE call originates in a first mobile network operated by a first MNO, and terminates in the same mobile network, then 4G Mobile networks 130-1 and 130-2 are portions of a same 4G Mobile Network 130 that interconnects with packet data network 160.

P-GW 325-2 includes a network device that acts as a router and a gateway between packet data network 160 and 4G Mobile Network 130-2, and forwards session data between a base band unit in 4G Mobile Network 130-2 and packet data network 160. S-GW 330-2 includes a network device that routes and forwards session data between P-GW 325-2 and a LTE RAN 340-2 serving the session's destination UE 110.

Mobility Management Entity node (MME) 335-2 includes a network device that acts as a control entity for 4G Mobile Network 130-2, including communicating with a HSS (not shown in FIG. 3B) of 4G Mobile Network 130-2 for user/device authentication and for user/device profile download. MME node 335-2 further provides UEs 110 with mobility management and session management functions using, for example, Network Access Stratum (NAS) signaling.

LTE RAN 340-2 may include a base band unit (BBU2) 345-2 and one or more remote radio heads (RRHs). LTE RAN 340-2 may include one or more additional base band units (BBUs) and RRHs, and other wireless nodes and components, not shown in FIG. 3B. BBU2 345-2 may connect to the one or more RRHs via, for example, optical fibers. BBU2 345-2 includes a network device that operates as a digital function unit that transmits digital baseband signals to the one or more RRHs, and receives digital baseband signals from the one or more RRHs. If BBU2 345-2 is connected to the one or more RRHs via, for example, optical fibers, then BBU2 345-2 may convert the digital baseband signals into corresponding optical signals for transmission to the RRHs, and may receive optical signals from the RRHs and convert the optical signals into corresponding digital baseband signals.

The RRHs include network devices that operate as radio function units that transmit and receive radio frequency (RF) signals to/from UEs 110. If the RRH(s) is/are connected to BBU2 345-2 via an optical fiber, the RRH(s) may convert received RF signals to optical signals, and transmit the optical signals to BBU2 345-2. Additionally, the RRH(s) may receive optical signals from BBU2 345-2 via the optic fiber, convert the optical signals to RF signals for transmission via one or more antennas (e.g., one or more antenna arrays) of the RRHs. Each of the RRHs may include at least one antenna array, transceiver circuitry, and other hardware and software components for enabling the RRHs to receive data via wireless RF signals from UE 110-2, and to transmit wireless RF signals to UE 110-2. BBU2 345-2 and the associated RRH(s) represent a distributed evolved NodeB (eNB).

FIGS. 3A and 3B illustrate a single exemplary implementation of the configuration of the components of Next Generation Mobile networks 120 and 4G Mobile networks 130. Other components and configurations of Next Generation Mobile networks 120 and 4G Mobile Networks 130 may, however, may be implemented. Therefore, Next Generation Mobile networks 120 and 4G Mobile Networks 130 may each include additional, fewer and/or different components, that may be configured differently, than depicted in FIGS. 3A and 3B and described herein. For example, though only a single base band unit BBU 320, and a single base band unit BBU 345, are shown as components of Next Generation RAN 315 and LTE RAN 340, respectively, each of Next Generation RAN 315 and LTE RAN 340 may include multiple base band units (i.e., >1 base band unit), with each of the multiple base band units further connecting to at least one RRH.

Figure 4:
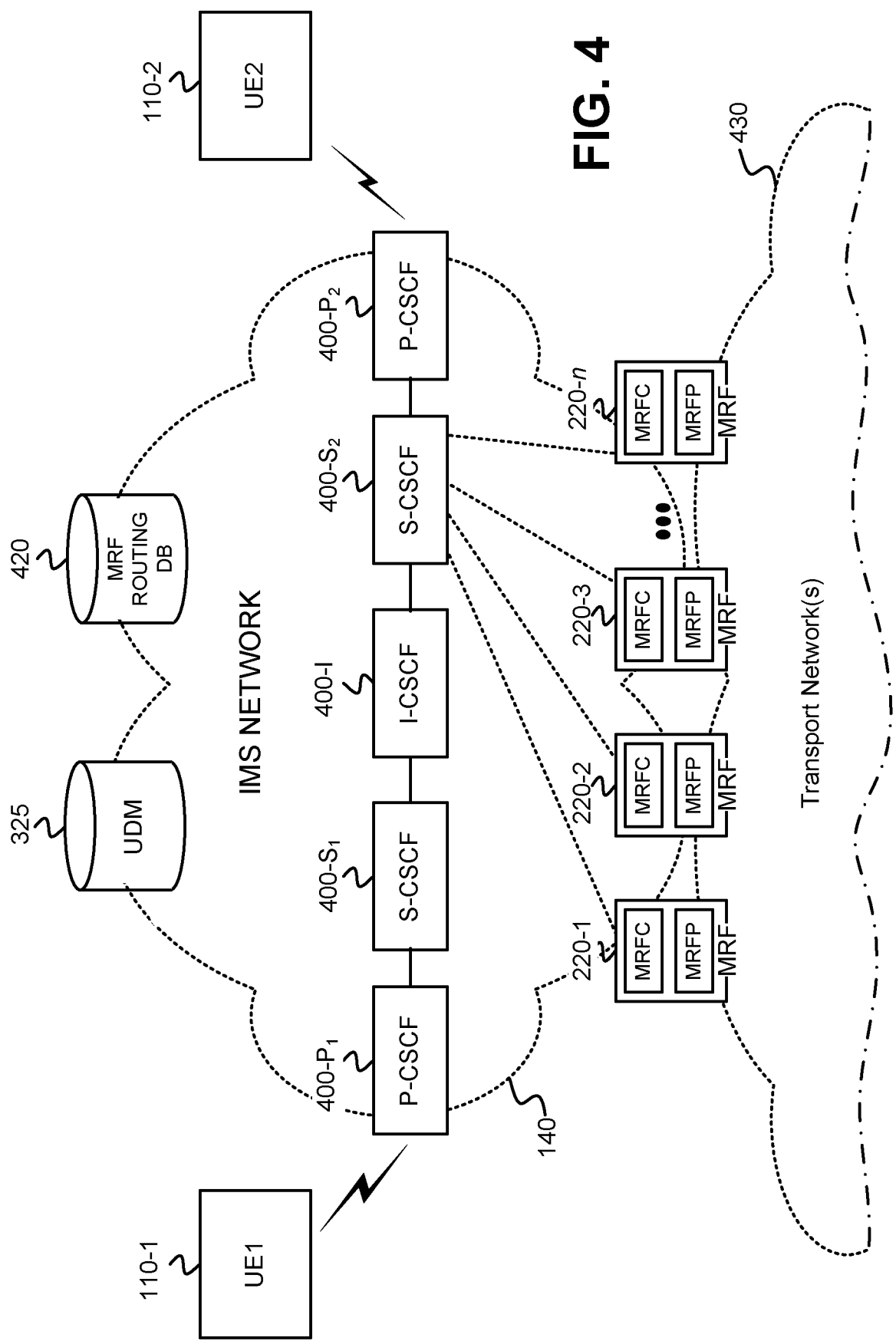
FIG. 4 depicts components of the IMS network of the network environment of FIG. 1A according to one exemplary implementation.

FIG. 4 depicts components of IMS network 140 of the network environment 100 of FIG. 1A according to one exemplary implementation. As shown, IMS network 140 may include a Proxy Call Session Control Function (P-CSCF) 400-P$_1$, a serving Call Session Control Function (S-CSCF) 400-S$_1$, an Interrogating Call Session Control Function I-CSCF 400-I, a S-CSCF 400-S$_2$, a P-CSCF 400-P$_2$, and multiple Media Resource Functions (MRFs) 220-1 through 220-N. P-CSCF 400-P$_1$, S-CSCF 400-S$_1$, I-CSCF 400-I, S-CSCF 400-S$_2$, and P-CSCF 400-P$_2$ may be generically and individually referred to herein as "CSCF 400". As further shown in FIG. 4, IMS network 140 may include, or interconnect with (via another network), a UDM 325 and a MRF routing DB 420. MRF routing DB 420 may store a data structure that further stores identifiers of particular MRFs that are closest to each UPF 210 of Next Generation Mobile network(s) 120 and may further store identifiers of particular SRs 230 and/or SBCs 240 that are closest to MRFs 220. For example, a network administrator may determine a particular MRF, for each UPF 210, that has the least distance between the MRF and the UPF 210. As another example, the network administrator may determine a particular SBC 240 that has a least distance from a particular MRF 220. In one implementation, the term "distance," as used herein, refers to an amount of latency between any two network nodes/devices (e.g., end-to-end latency between UE1 110-1 and 110-2, latency between UPF1 210-1 and MRF 220, latency between MRF 220 and a SBC 240, etc.). Thus, a larger "distance" corresponds to a higher latency than a shorter "distance." In other implementations, however, the term "distance" may refer to, and include, other network-related parameters such as, for example, a number of network hops in the transport path, and/or a link cost(s) associated with one or more links in the transport path.

For example, a "closest" MRF 220 to a UPF 210, or a "least distance" between a MRF 220 and an UPF 210 may include a MRF 220 having a network location relative to UPF 210 that minimizes end-to-end latency associated with the transport of the voice call. Additionally, a "closest" SBC 240 to a MRF 220, or a "least distance" between a MRF 220 and a SBC 240, may include a SBC 240 having a network location relative to the MRFP of the MRF 220 that also minimizes end-to-end latency associated with the transport of the voice call. The network administrator may populate the data structure of MRF routing DB 420 with associations between each UPF 210 and a corresponding MRF 220 and, possibly a SR 230 and/or SBC 240, that are the closest, from the standpoint of distance (e.g., media latency), to the UPF 210. MRF routing DB 420 may be stored in a centralized network device or may be stored locally at each CSCF 400 of IMS network 140.

As also shown in FIG. 4, MRFs 220-1 through 220-n of IMS network 140 may intersect with the transport network(s) 430 such that MRFs 220-1 through 220-n may process and route media, associated with voice calls, transported via transport network(s) 430 between call endpoints (e.g., UE1 110-1 and UE2 110-2). Transport network(s) 430 may include one or more networks that transport calls, including call media, between call endpoints. Transport network(s) 430 may, for example, include mobile networks 120 and 130, network 250, and/or packet data network 160 of FIGS. 1A-3B.

P-CSCF 400-P$_1$ acts as an edge of IMS network 140 through which UE 110-1 obtains access. P-CSCF 400-P$_1$ maintains an awareness of all IMS endpoints that are currently registered with IMS network 140, and performs various manipulations of SIP signaling messages that are arriving from, or being sent to, the IMS endpoints (e.g., UEs 110-1 and 110-2). P-CSCF 400-P$_1$ maintains a connection with S-CSCF 400-S$_1$.

S-CSCF 400-S$_1$ processes all originating and terminating SIP requests and responses associated with endpoints registered with S-CSCF 400-S$_1$ (including UE 110-1). S-CSCF 400-S$_1$ routes the SIP signaling towards its destination (e.g., towards P-CSCF 400-P$_1$ and UE 110-1), or towards UE 110-2 via I-CSCF 400-I. S-CSCF 400-S$_1$, upon receipt of an SIP invite associated with a voice call originating from UE 1 110-1, obtains, from UDM 325, information identifying the UPF 210 (e.g., UPF1 210-1) that currently serves UE 1 110-1, inserts the UPF identifying information into the SIP invite, and forwards the SIP invite towards the terminating CSCF 2 (e.g., S-CSCF 400-S$_2$). The user database of UDM 325 may support all of the CSCFs 400 of IMS network 140. The user DB of UDM 325 stores user subscription-related information (e.g., subscriber profiles), and may be used for authentication and authorization of the user.

I-CSCF 400-I passes SIP signaling to/from S-CSCF 400-S$_1$ and S-CSCF 400-S$_2$. I-CSCF 400-I queries UDM 325 to learn the identity of the S-CSCF assigned to a given UE 110 so that it can properly forward the SIP signaling.

S-CSCF 400-S$_2$ processes all originating and terminating SIP requests and responses associated with endpoints registered with S-CSCF 400-S$_2$ (including UE 110-2). S-CSCF 400-S$_2$ routes the SIP signaling towards its destination (e.g., towards P-CSCF 400-P$_2$ and UE 110-2), or towards UE 110-1 via I-CSCF 400-I. S-CSCF 400-S$_2$ receives the SIP invite, with the UPF identifying information, from S-CSCF 400-S$_1$, and retrieves the UPF identifying information, that identifies the UPF 210 that currently serves the voice call originating UE1 110-1, from the SIP invite. S-CSCF 400-S$_2$ performs a lookup into MRF routing DB 420 to retrieve information for a MRF of MRFs 220-1 through 2200-n that is closest to the UPF that currently serves UE1 110-1. S-CSCF 400-S$_2$ assigns the retrieved MRF, that is closest to the UPF that currently serves UE1 110-1, as the media anchor for optimized routing and processing of media between UE1 110-1 and UE2 110-2 associated with voice calls. The assigned MRF 220 subsequently processes a media stream associated with the voice call between UE1 110-1 and UE2 110-2.

Each of MRFs 220-1 through 220-n (generically referred to herein as "MRFs 220" or "MRF 220") includes a Media Resource Function Controller (MRFC) and a Media Resource Function Processor (MRFP). Each MRFC includes a signaling plane node that manages media resources by controlling its MRFP based on information/signaling received from an Application Server (not shown) or from a S-CSCF 400-S (e.g., S-CSCF 400-S$_2$ shown in FIG. 4). Each MRFP includes a node, that intersects with the transport network(s) 430, to process media streams (e.g., RTP streams) associated with calls, crossing transport network(s) 430 between UE1 110-1 and UE2 110-2, based on control instructions from the MRFC of the MRF. The media stream processing may include, for example, bridging multiple streams for conferencing, audio transcoding, recording, media analysis (e.g., speech recognition), text-to-speech rendering, video processing, and announcement playing.

P-CSCF 400-P$_2$ acts as an edge of IMS network 140 through which UE 110-2 obtains access. P-CSCF 400-P$_2$ maintains an awareness of all IMS endpoints that are currently registered with IMS network 140 and performs various manipulations of SIP signaling messages that are arriving from, or being sent to, the IMS endpoints (e.g., UEs 110-1 and 110-2). P-CSCF 400-P$_2$ maintains a connection with S-CSCF 400-S$_2$. S-CSCF 400-S$_1$ and S-CSCF 400-S$_2$ may obtain subscriber profile information from UDM 325 to determine whether UE 110-1 and/or UE 110-2 are subscribed for usage of 4G Mobile network 130 and/or Next Generation Mobile Network 120.

The IMS network nodes shown in FIG. 4, including P-CSCF S-CSCF I-CSCF 400-I, S-CSCF 400-S$_2$, P-CSCF 400-P$_2$ and MRFs 220-1 through 220-N may each include functionality implemented in multiple, different network devices, or in a same, single network device. The configuration of network components of IMS network 140 shown in FIG. 4 is for illustrative purposes. Other configurations may be implemented. Therefore, IMS network 140 may include additional, fewer and/or different components that may be configured in a different arrangement than that depicted in FIG. 4.

Figure 5:
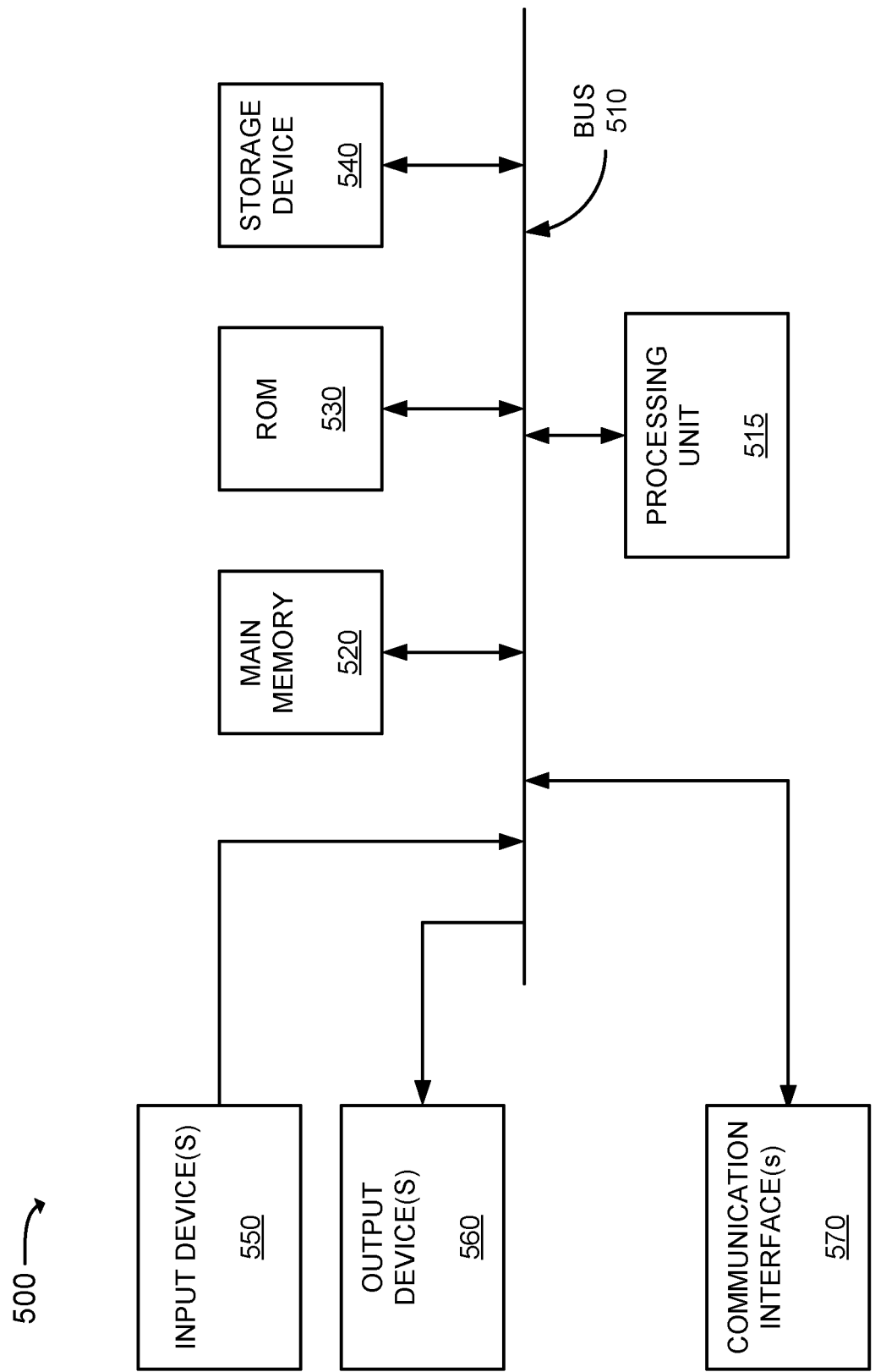
FIG. 5 is a diagram of exemplary components of a network device that may correspond to various devices and network nodes of FIGS. 1A-4.

FIG. 5 is a diagram of exemplary components of a network device 500. Network device 500 may correspond to UE 110, UPF node 210, SMF node 305, AMF node 310, BBU 1 320, BBU 2 345, P-GW node 325, S-GW node 330, UDM 325, CSCFs 400, and/or MME node 335. Network device 500 may include a bus 510, a processing unit 515, a main memory 520, a read only memory (ROM) 530, a storage device 540, an input device 550, an output device 560, and a communication interface(s) 570. Bus 510 may include a path that permits communication among the elements of network device 500.

Processing unit 515 may include one or more processors or microprocessors which may interpret and execute stored instructions associated with one or more processes, or processing logic that implements the one or more processes. For example, processing unit 515 may include, but is not limited to, programmable logic such as Field Programmable Gate Arrays (FPGAs) or accelerators. Processing unit 515 may include software, hardware, or a combination of software and hardware for executing the processes described herein. Main memory 520 may include a random access memory (RAM) or another type of dynamic storage device that may store information and, in some implementations, instructions for execution by processing unit 515. ROM 530 may include a Read Only Memory (ROM) device or another type of static storage device (e.g., Electrically Erasable Programmable ROM (EEPROM)) that may store static information and, in some implementations, instructions for use by processing unit 515. Storage device 540 may include a magnetic and/or optical recording medium and its corresponding drive. Main memory 520, ROM 530 and storage device 540 may each be referred to herein as a "non-transitory computer-readable medium" or a "non-transitory storage medium."

Input device 550 may include one or more devices that permit a user or operator to input information to network device 500, such as, for example, a keypad or a keyboard, a display with a touch sensitive panel, voice recognition and/or biometric mechanisms, etc. Output device 560 may include one or more devices that output information to the operator or user, including a display, a speaker, etc. Input device 560 and output device 560 may, in some implementations, be implemented as a graphical user interface (GUI) that displays GUI information and which receives user input via the GUI. In some implementations, such as when network device 500 is a UPF node 210, SMF node 305, AMF node 310, P-GW node 325, S-GW node 330, UDM 325, or MME node 335, input device 650 and/or output device 560 may be omitted from network device 500.

Communication interface(s) 570 may include one or more transceivers that enable network device 500 to communicate with other devices and/or systems. For example, in the case where network device 500 is a UE 110, communication interface(s) 570 may include a wireless transceiver (including at least one antenna) for communicating with one or more RRHs of Next Generation RAN 315 or LTE RAN 340. In the cases of UPF node 210, SMF node 305, AMF node 310, P-GW node 325, S-GW node 330, MME node 335, BBU 320 and BBU 345, communication interface(s) 570 may include at least one wired transceiver for wired communication via Next Generation Mobile network 120 and/or 4G Mobile Network 130. In some implementations, communication interface(s) 570 of BBU 320 and BBU 345 may include one or more optical transceivers for communicating with RRHs via optical fiber.

Network device 500 may perform certain operations or processes, as may be described herein. Network device 500 may perform these operations in response to processing unit 515 executing software instructions contained in a computer-readable medium, such as memory 520. A computer-readable medium may be defined as a physical or logical memory device. A logical memory device may include memory space within a single physical memory device or spread across multiple physical memory devices. The software instructions may be read into main memory 520 from another computer-readable medium, such as storage device 540, or from another device via communication interface(s) 570. The software instructions contained in main memory 520 may cause processing unit 515 to perform the operations or processes, as described herein. Alternatively, hardwired circuitry (e.g., logic hardware) may be used in place of, or in combination with, software instructions to implement the operations or processes, as described herein. Thus, exemplary implementations are not limited to any specific combination of hardware circuitry and software.

The configuration of components of network device 500 illustrated in FIG. 5 is for illustrative purposes only. Other configurations may be implemented. Therefore, network device 500 may include additional, fewer and/or different components, arranged in a different configuration, than depicted in FIG. 5.

Figure 6:
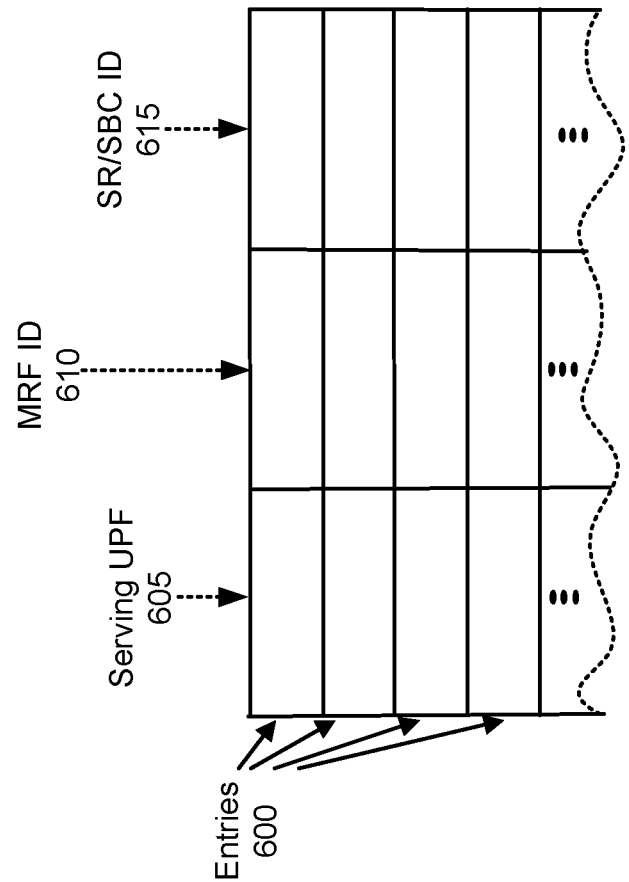
FIG. 6 depicts an exemplary implementation of a data structure that may be stored in the Media Resource Function Routing database of FIG. 4.

FIG. 6 depicts an exemplary implementation of a data structure that may be stored in MRF routing DB 420. As shown, the stored data structure may include multiple entries 600, with each entry 600 including a serving UPF field 605, a MRF identifier (ID) field 610, and a SR/SBC ID field 615.

Serving UPF field 605 stores a unique identifier (ID) associated with a particular UPF 210 in Next Generation Mobile network(s) 120 that performs, among other functions, packet routing and forwarding, packet inspection, Quality of Service (QoS) handling, and serving as a point of interconnection between a Next Generation Mobile Network 120 and packet data network 160, or between Next Generation Mobile Network 120 another transport network that is different than Next Generation Mobile Network 120 (e.g., a Public Switched Telephone Network (PSTN) or Code Division Multiple Access (CDMA) network to which UE2 110-2 may be connected via a wireless or wired connection). In one implementation, the unique ID may include a network address (e.g., Internet Protocol (IP) address) of the UPF 210. Each UPF 210 in Next Generation Mobile network 120, identified in a field 605 of DB 420, may serve one or more UEs 110 during packet transport associated with voice calls between call endpoints (e.g., UE1 110-1 and UE2 110-2).

MRF identifier (ID) field 610 stores a unique ID associated with a particular MRF 220 (e.g., an MRFC and MRFP) that is closest to the UPF identified in the corresponding field 605 of the entry 600. In one implementation, the unique ID may include a network address (e.g., Internet Protocol (IP) address) of the MRF 220. For example, a network administrator may determine a particular MRF that has a least end-to-end latency for packets transported between the UPF identified in field 605 and the MRF and may insert the determined MRF into field 610 for storage in DB 420. Session Router (SR)/Session Border Controller (SBC) ID field 615 stores a unique ID associated with a particular SR and/or SBC that is used for media transport in a particular case where UE1 110-1 is connected to Next Generation Mobile Network 120 and UE2 110-2 is connected to a second network that may be a non-Next Generation Mobile Network such as, for example, a PSTN or CDMA network. In this particular case, media transport between UE1 110-1 and UE2 110-2 occurs across Next Generation Mobile Network 120 and the second network via the MRF 220 and the SBC 240. The SR and/or SBC ID stored in field 615 identifies the SR 230 and/or SBC 240 that is closest to the MRF 220 identified in field 610. The network administrator, for example, may also determine the particular SR 230 and/or SBC 240 that causes a least end-to-end latency for packets transported between from UE1 110-1 to UE2 110-2 via the UPF 210, MRF 220, and SBC 240, and may insert the determined SR/SBC into field 615 for storage in DB 420.

To locate a particular entry 600, the data structure of MRF routing DB 420 may be queried with particular data to locate an entry 600 having matching data stored in a particular one of the fields 605, 610, or 615. When such an entry 600 is located, data may be stored in one or more fields of the entry 600, or data may be retrieved from one or more fields of the entry 600. For example, if a particular UPF ID of a UPF 210 serving a UE 110 is known, then the entries 600 of MRF routing DB 420 may be queried with the UPF ID to locate an entry 600 having a matching UPF ID stored in field 605. Upon location of an entry 600 having a matching UPF ID stored in field 605, a MRF ID and SR/SBC ID may be retrieved from fields 610 and 615, respectively, of the located entry 600.

The data structure of MRF routing DB 420 of FIG. 6 is depicted as including a tabular data structure with a certain number of fields having certain content. The tabular data structure shown in FIG. 6, however, is for illustrative purposes. Other types of data structures may alternatively be used. The number, types, and content of the entries and/or fields in the data structures illustrated in FIG. 6 are also for illustrative purposes. Other data structures having different numbers of, types of and/or content of, the entries and/or the fields may be implemented. Therefore, the data structure depicted in FIG. 6 may include additional, fewer and/or different entries and/or fields than those shown.

Figure 7:
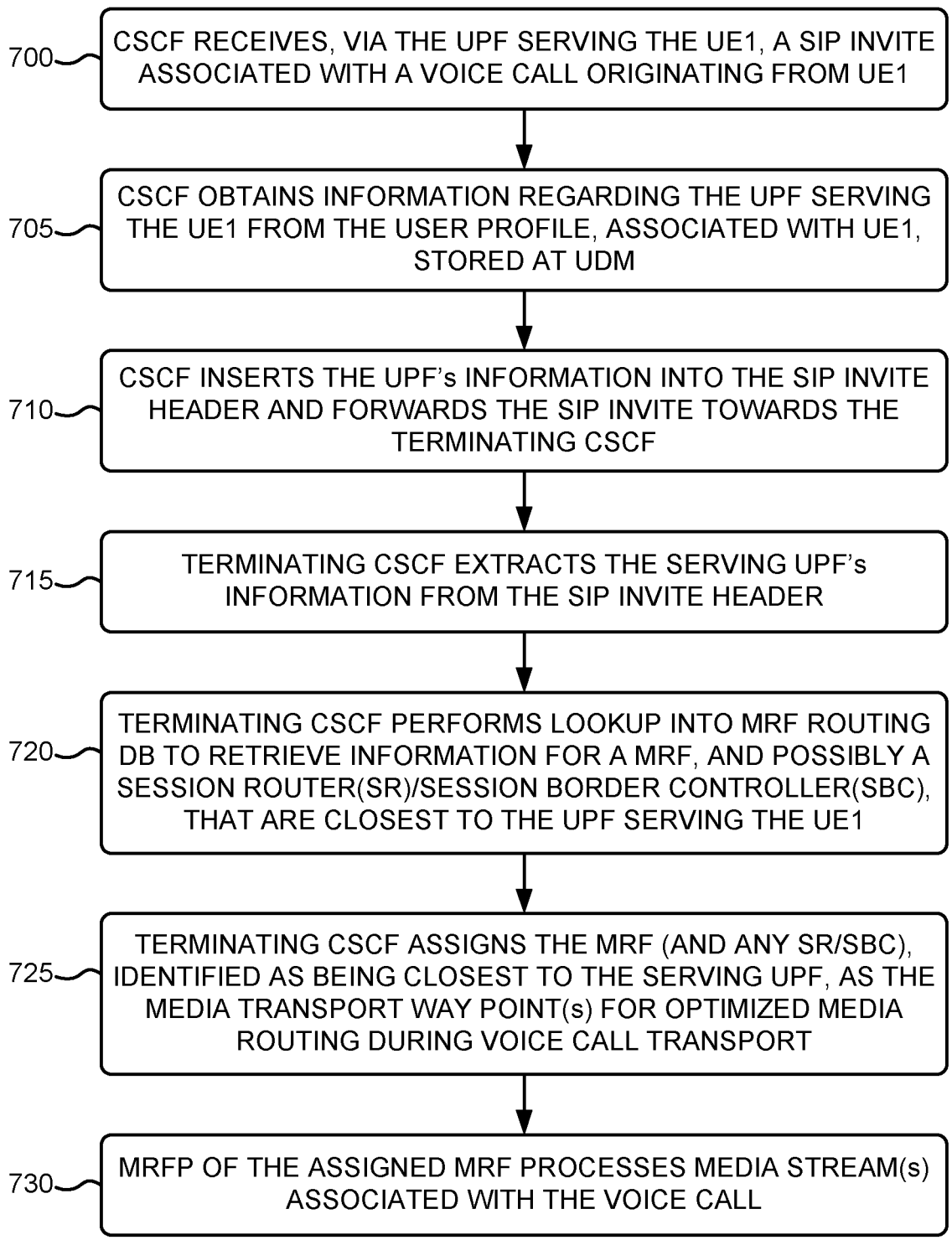
FIG. 7 is a flow diagram of an exemplary process for assigning an IMS Media Resource Function for optimized routing and processing of media associated with a voice call (e.g., Voice over New Radio call) that traverses a transport network(s)

FIG. 7 is a flow diagram of an exemplary process for assigning an IMS MRF 220 for optimized routing and processing of media associated with a voice call that traverses transport network(s) 430. The exemplary process of FIG. 7 may be implemented by one or more CSCFs 400 (e.g., S-CSCF 400-S$_1$ and S-CSCF 400-S$_2$ of FIG. 4) and a selected MRF 220. The exemplary process of FIG. 7 is described below with reference to FIGS. 8 and 9.

Figure 8:
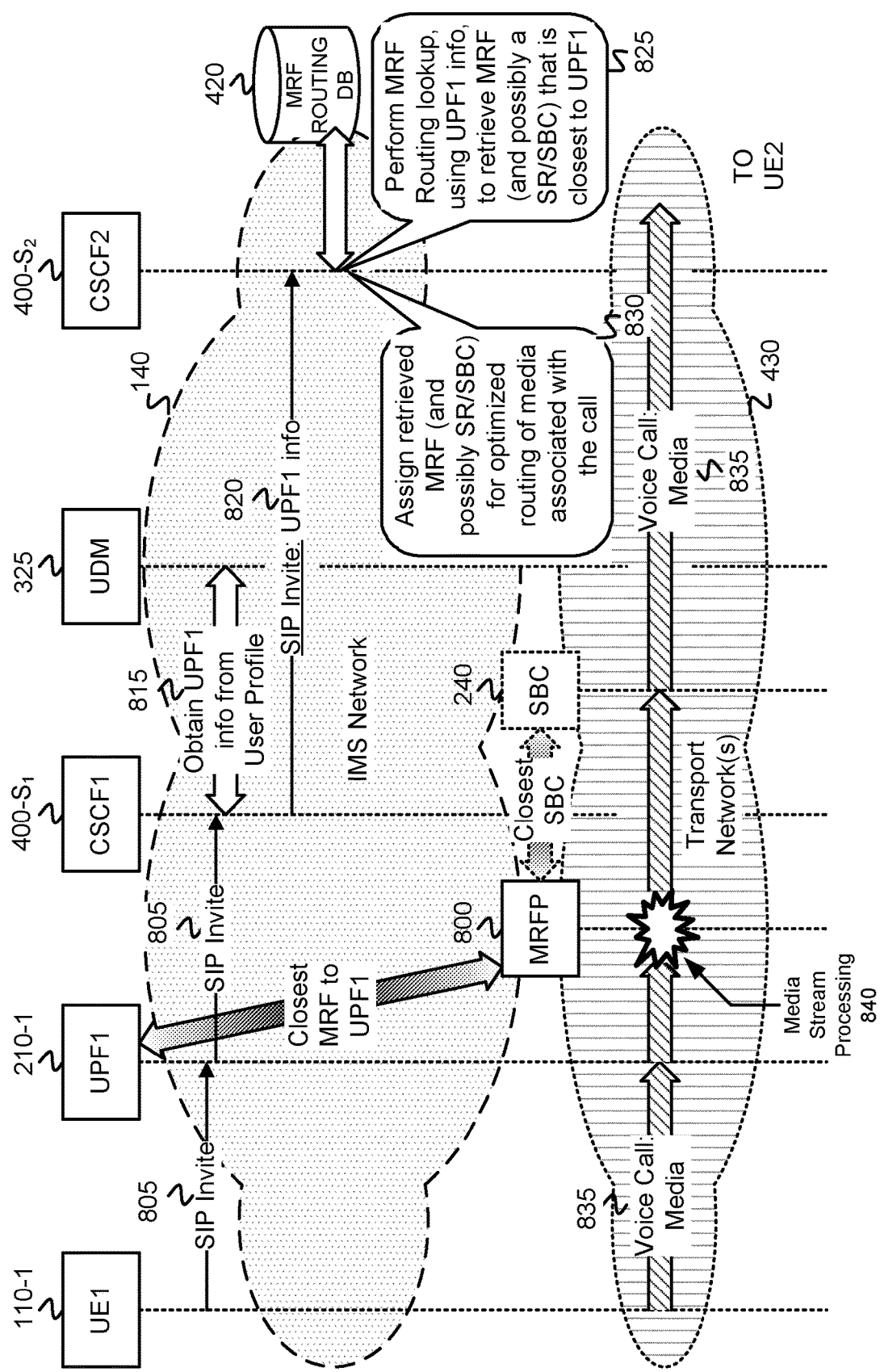
FIG. 8 is an exemplary messaging/operations diagram associated with the process of FIG. 7.

The exemplary process may include the CSCF 400 receiving, via the UPF1 210-1 serving UE1 110-1, a SIP invite message associated with the voice call originating from the UE1 110-1 (block 700). The CSCF 400 receiving the SIP invite message may include, for example, S-CSCF 400-S$_1$ in FIG. 4. FIG. 8 depicts UPF1 210-1 receiving a SIP invite message 805 from UE 110-1, and forwarding the SIP invite message 805 to CSCF1 400-S$_1$.

The CSCF 400 obtains information regarding the UPF serving the UE1 110-1 from the user profile, that is associated with UE1 110-1, stored at UDM 325 (block 705). The ID of the UPF currently serving the UE1 110-1 may be retrieved from the user profile stored at UDM 325 and returned to CSCF 400. FIG. 8 depicts CSCF1 400-S$_1$ obtaining 815 information regarding UPF1 210-1 from UDM 325.

The CSCF 400 inserts the UPF's information into the SIP invite message's header, and forwards the SIP invite message towards the terminating CSCF (block 710). For example, the CSCF 400 may insert the UPF identifier, obtained in block 705, into the header data of the SIP invite message. FIG. 8 depicts CSCF1 400-S$_1$ forwarding the SIP invite message 820, with the inserted UPF information, to the terminating CSCF 400-S$_2$.

The terminating CSCF 400 extracts the serving UPF's information from the SIP invite header (block 715), and performs a lookup into the MRF routing DB 420 to retrieve information for an MRF, and possibly a SR/SBC, that are closest to the UPF serving the UE1 110-1 (block 720). The terminating CSCF 400 extracts the UPF ID of the UPF 210 currently serving UE1 110-1 from the header of the SIP invite message, and queries MRF routing DB 420 with the UPF ID to locate an entry 600 in DB 420 that stores a matching UPF ID. Upon location of the entry 600, the terminating CSCF 400 retrieves a MRF ID from field 610 of the located entry 600. The terminating CSCF 400 may additionally retrieve a SR/SBC ID from field 615 of the located entry 600, if a SR/SBC ID is stored in field 615. FIG. 8 depicts CSCF 400-S₂ performing 825 a MRF routing DB 420 lookup, using the UPF1 information retrieved from the SIP invite header, to retrieve information that identifies an MRF 220 that is closest to the UPF 1.

Figure 9:
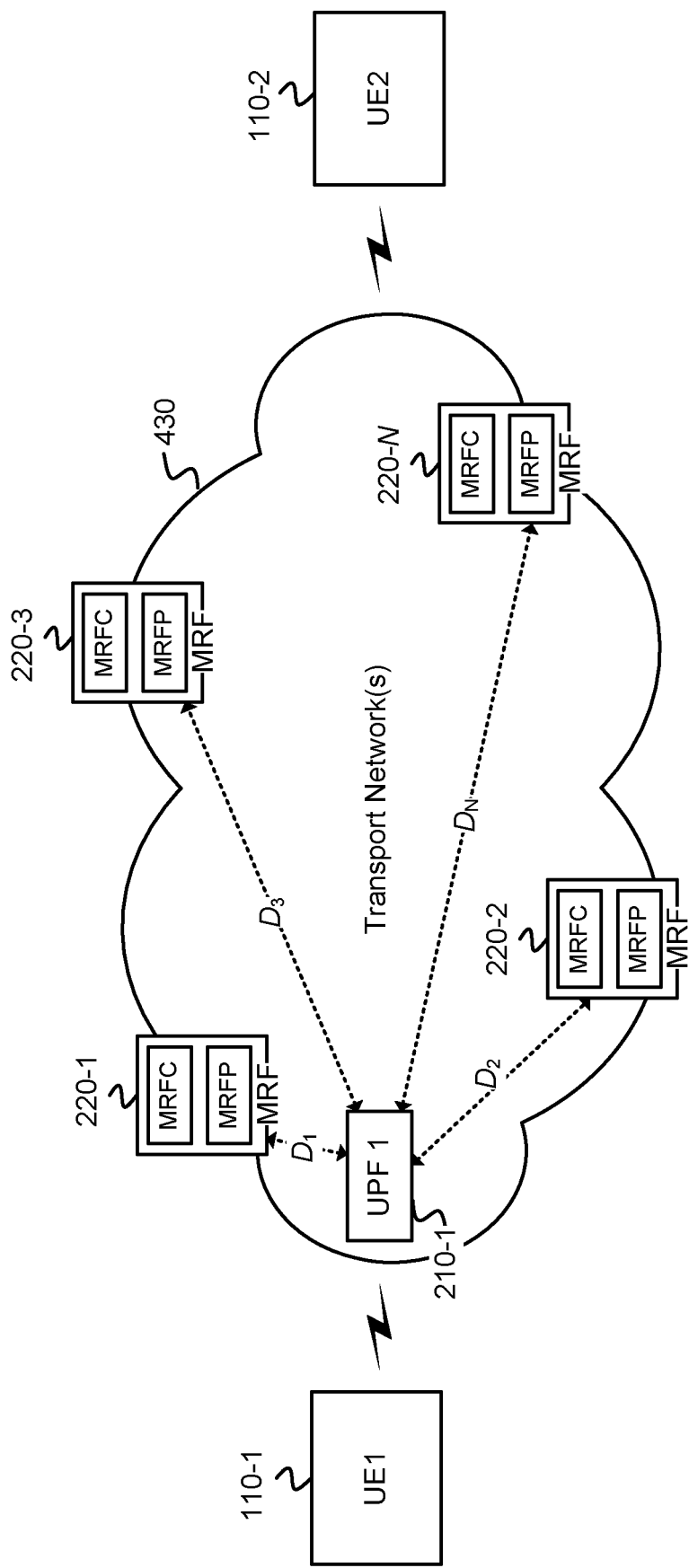
FIG. 9 illustrates an example of distances D between the User Plane Function serving a call originating UE and N different Media Resource Functions located at various network locations in the transport network(s)

FIG. 9 illustrates an example of distances D between the UPF (e.g., UPF1 300-1) serving UE1 110-1 and N different MRFs 220 located at various network locations in the transport network(s) 430. As shown, MRF 220-1 is located at a distance $D_1$ from UPF1 210-1, MRF 220-2 is located at a distance $D_2$ from UPF1 210-1, MRF 220-3 is located at a distance $D_3$ from UPF1 210-1, and MRF 220-N is located at distance $D_N$ from UPF1 210-1, where $D_N > D_3 > D_2 > D_1$. In one implementation, the distance D for each MRF 220 may represent a measure of the media latency between the MRF 220 and UPF1 210-1, or the overall end-to-end media latency from UE1 110-1 to UE2 110-2, via UPF1 210-1, the MRF 220, and UPF2 210-2, over the transport network(s) 430. Thus, a lower media latency has a smaller distance D than a higher media latency.

Figure 10:
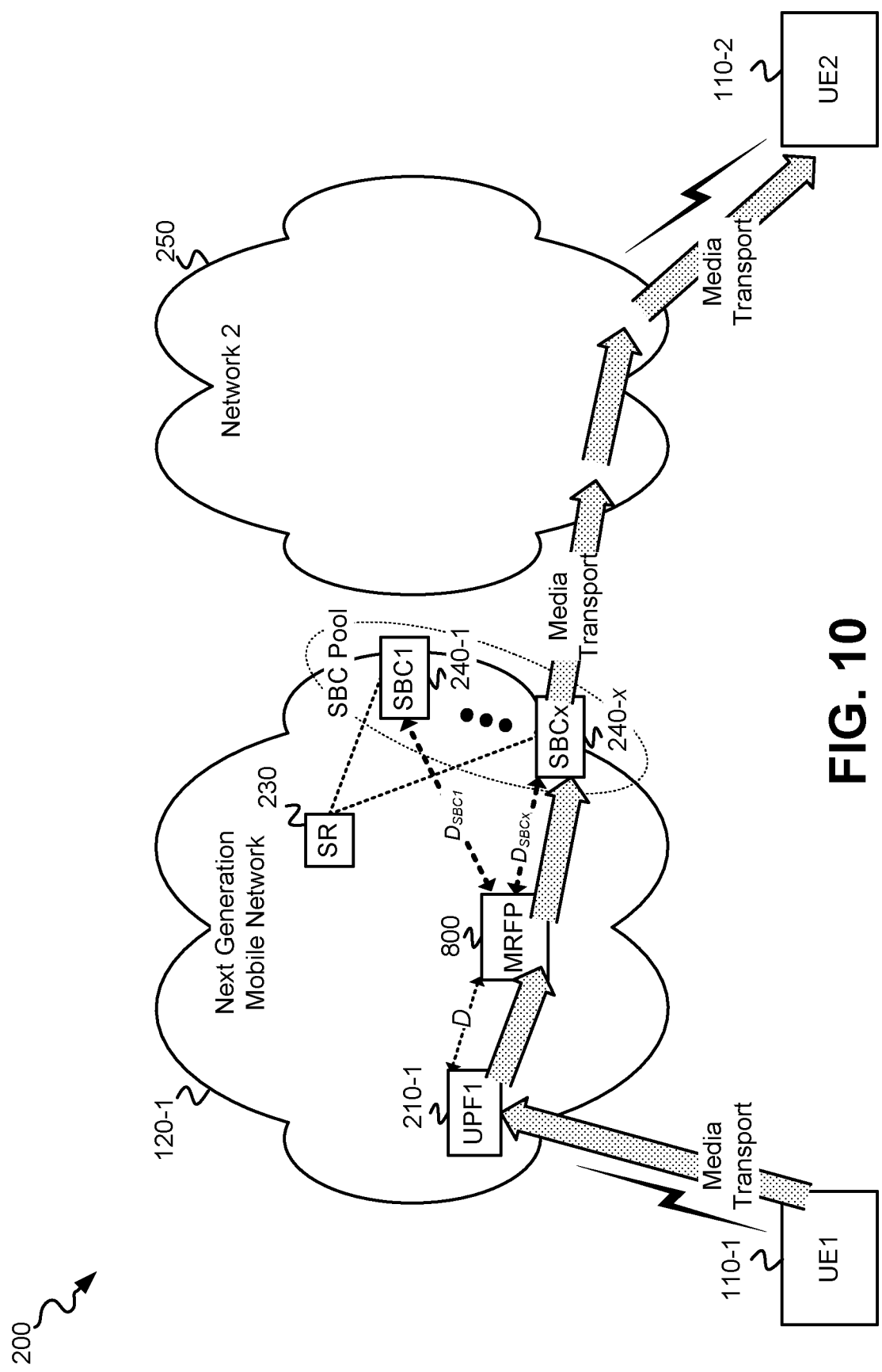
FIG. 10 illustrates an example of distances $D_{SBC}$ between Session Border Controllers and the Media Resource Function Processor of the Media Resource Function processing transported media associated with a voice call.

FIG. 10 further illustrates an example of distances $D_{SBC}$ between the MRFP 800 of the MRF 220 and x different SBCs 240 located at various network locations in transport network(s) 430 relative to MRFP 800. As shown, SBC1 240-1 is located at a distance $D_{SBC1}$ from MRFP 800, and SBCx is located at a distance $D_{SBCx}$ from MRFP 800. In one implementation, the distance $D_{SBC}$ for each SBC 240 may represent a measure of the media latency between the MRFP 800 and SBC 240, or the overall end-to-end media latency from UE1 110-1 to UE2 110-2, via UPF1 210-1, the MRFP 800, and SBC 240, over the transport network(s) 430. Thus, a lower media latency has a smaller distance $D_{SBC}$ than a higher media latency. An SBC 240 from the pool of SBCs may be selected for media transport between MRFP 800 and network 2 250 based on the SBC 240 having a least distance $D_{SBC}$.

The terminating CSCF assigns the MRF 220 (and any SR/SBC), identified as being closest to the serving UPF 210, as a media transport way point(s) (e.g., transport path anchor) for optimized media routing during voice call transport (block 725). In one implementation, assignment of the closest MRF 220 to the serving UPF 210 may include notifying the serving UPF 210 of the assigned MRF 220 such that the serving UPF 210 routes packets of the call to the assigned MRF 220 via the transport network(s) 430. Additionally, if a SR/SBC is to be assigned for transport of the media (e.g., to network 2 250 in FIG. 10), then the terminating CSCF assigns the SR and/or SBC, identified as being the closest, as another media transport way point for media routing during call transport from UE1 110-1 to UE2 110-2 via Next Generation Mobile network 120-1 and network 2 250. Referring again to the example of FIG. 9, MRF 220-1, having the least distance of $D_1$ from UPF1 210-1, is assigned to the routing of media of a voice call (e.g., VoNR call) between UE1 110-1 and UE2 110-2. Additionally, referring again to the example of FIG. 10, SBCx 240-x, having the least distance of $D_{SBCx}$ from MRFP 800 (and UPF1 210-1), is additionally assigned to the routing of the media of the voice call between UE1 110-1 and UE2 110-1 via network 120-1 and network 250. The messaging/operations diagram of FIG. 8 depicts CSCF 400-S₂ assigning 830 the retrieved MRF (and possibly SR/SBC), as the closest MRF (and SR/SBC) to the serving UPF1 210-1, for routing of media associated with the call.

A MRFP 800 of the assigned MRF 220 processes a media stream(s) associated with the voice call (block 730). The MRFP 800 of the assigned MRF 220 subsequently receives packets, including call media, associated with the call originating from UE1 110-1, from UPF1 210-1. The MRFP 800 performs processing of the media stream, including bridging multiple streams for conferencing, audio transcoding, recording, media analysis (e.g., speech recognition), text-to-speech rendering, video processing, and/or announcement playing. After processing of the media stream, the MRFP 800 routes and forwards the packets associated with the call towards the destination call endpoint (e.g., UE2 110-2) via transport network(s) 430. In circumstances where UE2 110-2 is connected to a non-Next Generation Mobile Network, such as a PSTN or CDMA network, then the MRFP 800 may route and forward the packets associated with the call to the assigned SBC 240 which, in turn, routes the packets via network 2 250 (e.g., in FIGS. 2B and 10). FIG. 8 depicts media 835 associated with the voice call originating from UE 110-1, being forwarded to UPF1 210-1 and then on to the MRFP 800 of the assigned MRF 220. The MRFP 800, being the closest MRF to UPF1 210-1, engages in processing 840 of the media stream(s) as the media stream(s) is transported on to UE2 110-1 (not shown in FIG. 8). FIG. 8 further depicts media, after media stream processing 840 by MRFP 800, being transported to SBC 240, as the closest SBC from the pool of SBCs, for routing to network 2 250 (not shown), in a particular circumstance where UE2 110-2 is connected to network 2 250, and where network 2 250 includes a non-Next Generation Mobile Network such as a PSTN or CDMA network. In circumstances where UE2 110-2 is connected to a Next Generation Mobile network 120, then SBC 240 may not be required in the media transport path, and the voice call media 835 may be transported from MRFP 800 to UE2 110-2 without being routed via any intervening SBC transport way point(s).

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks has been described with respect to FIG. 7, and operation/message flows with respect to FIG. 8, the order of the blocks and/or operation/message flows may be varied in other implementations. Embodiments have been described herein with respect to media transport associated with a voice call over a transport network(s). However, the techniques of media transport described herein may be additionally applied to multimedia sessions between network endpoints, such as an audio and video stream(s) between UE1 110-1 and UE2 110-2.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   receiving a message associated with a session between a first device and a second device;
   extracting, from the message, an identifier of a User Plane Function (UPF) serving the first device;
   determining a closest media resource function (MRF) to the UPF by using the identifier of the UPF; and
   assigning the determined closest MRF as an anchor in a network path between the first device and the second device.

2. The method of claim 1, wherein the message includes a Session Initiation Protocol (SIP) invite message transmitted from the first device to the second device.

3. The method of claim 1, wherein the session includes a voice call originating from the first device.

4. The method of claim 1, wherein determining the closest MRF to the UPF comprises:
   determining a MRF, of a plurality of MRFs, that has a least end-to-end latency with the UPF.

5. The method of claim 1, further comprising:
   notifying the UPF of the MRF for routing packets of the session to the MRF.

6. The method of claim 1, wherein receiving the message associated with the session includes receiving the message from a call session control function (CSCF) that inserted the identifier of the UPF into the message.

7. The method of claim 1, wherein the determined MRF includes a media resource function controller (MFRC) and a media resource function processor (MRFP).

8. A network device comprising:
   one or more processors configured to:
   receive a message associated with a session between a first device and a second device;
   extract, from the message, an identifier of a User Plane Function (UPF) serving the first device;
   determine a closest media resource function (MRF) to the UPF by using the identifier of the UPF; and
   assign the determined closest MRF as an anchor in a network path between the first device and the second device.

9. The network device of claim 8, wherein the message includes a Session Initiation Protocol (SIP) invite message transmitted from the first device to the second device.

10. The network device of claim 8, wherein the session includes a voice call originating from the first device.

11. The network device of claim 8, wherein, when determining the closest MRF to the UPF, the one or more processors are configured to:
    determine a MRF, of a plurality of MRFs, that has a least end-to-end latency with the UPF.

12. The network device of claim 8, wherein the one or more processors are further configured to:
    notify the UPF of the MRF for routing packets of the session to the MRF.

13. The network device of claim 8, wherein, when receiving the message associated with the session, the one or more processors are further configured to receive the message from a call session control function (CSCF) that inserted the identifier of the UPF into the message.

14. The network device of claim 8, wherein the determined MRF includes a media resource function controller (MFRC) and a media resource function processor (MRFP).

15. A non-transitory storage medium storing instructions executable by a network device, wherein the instructions comprise instructions that cause the network device to:
    receive a message associated with a session between a first device and a second device;
    extract, from the message, an identifier of a User Plane Function (UPF) serving the first device;
    determine a closest media resource function (MRF) to the UPF by using the identifier of the UPF; and
    assign the determined closest MRF as an anchor in a network path between the first device and the second device.

16. The non-transitory storage medium of claim 15, wherein the message includes a Session Initiation Protocol (SIP) invite message transmitted from the first device to the second device.

17. The non-transitory storage medium of claim 15, wherein the session includes a voice call originating from the first device.

18. The non-transitory storage medium of claim 15, wherein the instructions that cause the network device to determine the closest MRF to the UPF comprise instructions that cause the network device to determine a MRF, of a plurality of MRFs, that has a least end-to-end latency with the UPF.

19. The non-transitory storage medium of claim 15, wherein the instructions further comprise instructions that cause the network device to:
    notify the UPF of the MRF for routing packets of the session to the MRF.

20. The non-transitory storage medium of claim 15, wherein the instructions that cause the network device to receive the message associated with the session comprise instructions that cause the network device to receive the message from a call session control function (CSCF) that inserted the identifier of the UPF into the message.

* * * * *